Figure 4:
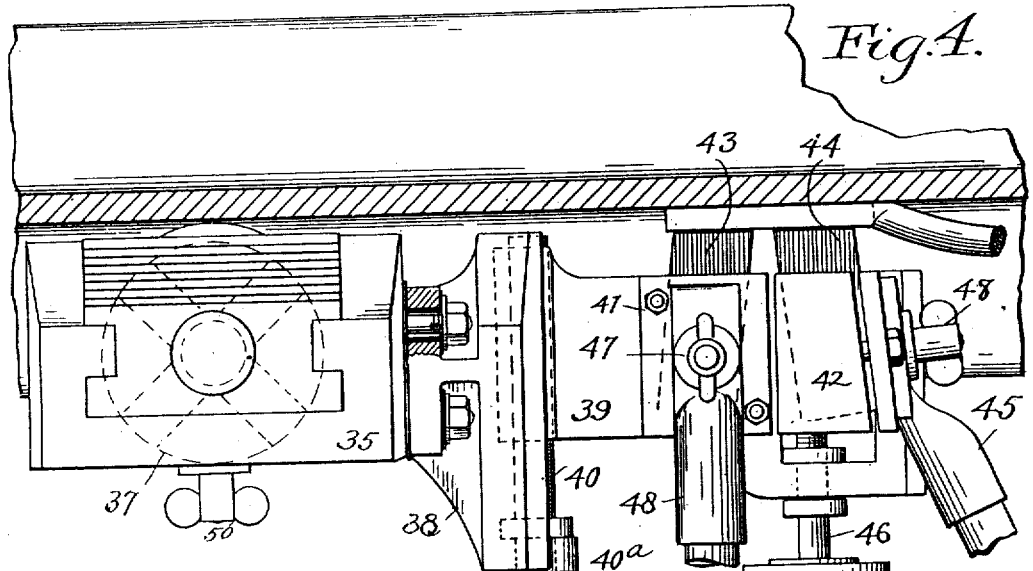

L. P. CRECELIUS & P. H. EBERLEIN.
RAIL BONDING APPARATUS.
APPLICATION FILED APR. 5, 1913.
1,242,524.
Patented Oct. 9, 1917.
3 SHEETS—SHEET 1.
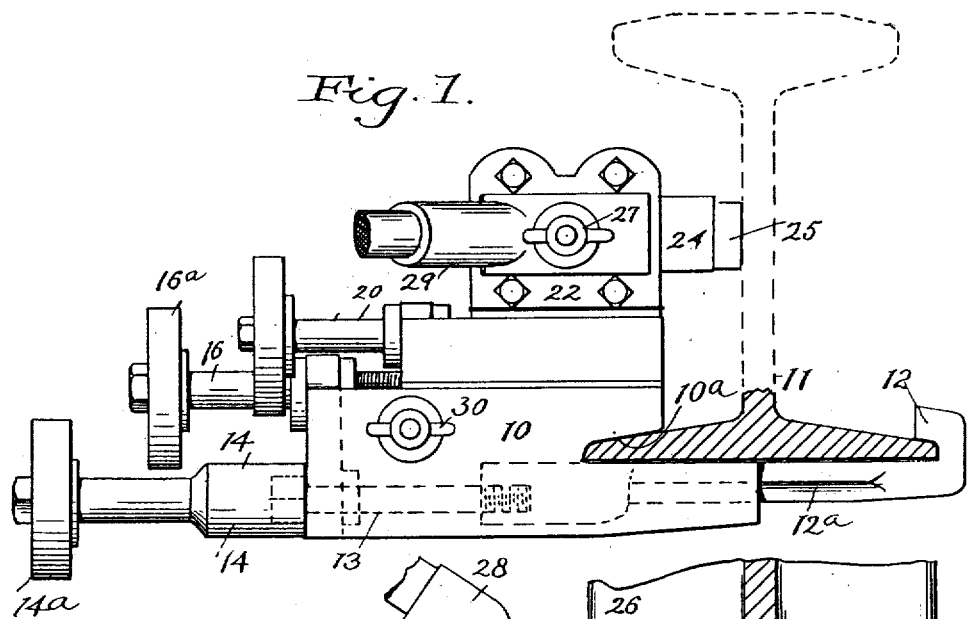
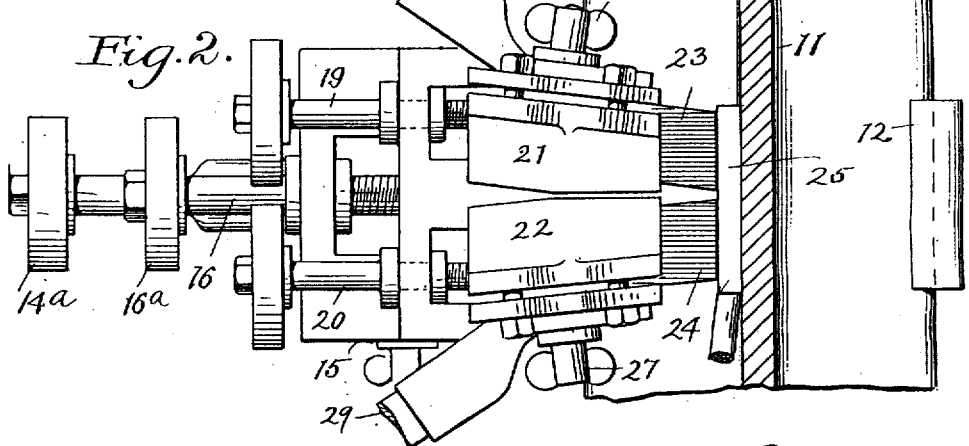
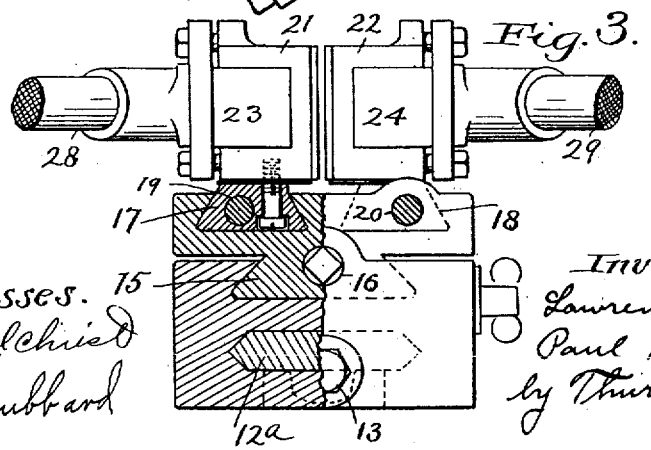
Witnesses.
E. B. Gilchrist
H. C. Hubbard
Inventors.
Lawrence P. Crecelius
Paul H. Eberlein
by Thurston & Kwis
Attys.

L. P. CRECELIUS & P. H. EBERLEIN.
RAIL BONDING APPARATUS.
APPLICATION FILED APR. 5, 1913.

1,242,524.

Patented Oct. 9, 1917.
3 SHEETS—SHEET 3.

UNITED STATES PATENT OFFICE.

LAWRENCE P. CRECELIUS AND PAUL H. EBERLEIN, OF CLEVELAND, OHIO, ASSIGNORS, BY DIRECT AND MESNE ASSIGNMENTS, TO THE ELECTRIC RAILWAY IMPROVEMENT COMPANY, OF CLEVELAND, OHIO, A CORPORATION OF OHIO.

RAIL-BONDING APPARATUS.

1,242,524.           Specification of Letters Patent.           Patented Oct. 9, 1917.

Application filed April 5, 1913. Serial No. 759,074.

*To all whom it may concern:*

Be it known that we, LAWRENCE P. CRECELIUS and PAUL H. EBERLEIN, citizens of the United States, and residents of Cleveland, in the county of Cuyahoga and State of Ohio, have invented a certain new and useful Improvement in Rail-Bonding Apparatus, of which the following is a full, clear, and exact description.

This invention relates to rail bonding apparatus adapted especially for uniting copper bonds to steel rails by brazing or soldering.

It is common at the present time to bond rails by clamping the bond to the rail, and to heat the bond and the portion of the rail in contact therewith, by means of an electric current and by a high resistance electrode, which engages the terminal of the bond and clamps the terminal against the rail. The apparatus which is used for this purpose is extremely cumbersome and bulky and is usually carried on a special car or truck which runs along the rails of the track, the clamping of the bond to the rail being accomplished by suitable arms which project downwardly from the car body, and extremely heavy conductors being utilized to convey the high amperage current required with the processes now in use, from the bond and rail to the terminals of the secondary of a transformer carried by the car. This apparatus is open to the very serious objection that it interferes with traffic, and has other minor disadvantages which need not be here enumerated.

One of the principal objects of the present invention is to provide a rail bonding apparatus which in no wise interferes with traffic carried on along the track being bonded, and further, the invention aims to simplify the apparatus and to reduce the weight and size of the same so that the car or conveyance which is adapted to convey or support parts of the apparatus need not be run along the rails of the track.

The above objects are attained by our invention in a very effective manner by reason of certain improvements, one of which is in the electrode holder which in accordance with the present invention, is adapted to be secured in fixed position relative to the rail and preferably directly thereto in such a manner that the gage line is clear and unobstructed.

A further improvement resides in the high resistance heating electrodes which are carried by the adjustable member of the clamp, the whole being so disposed that a very effective union can be secured between the bond and the rail with a much smaller current which enables us to reduce greatly the size of the conductors required to convey current to and from the secondary of the transformer, and in fact to reduce the size and weight of other parts which are not directly involved in the particular part of the apparatus forming the subject matter of the present invention.

Our invention may be here briefly summarized as consisting in certain novel details of construction, and combinations and arrangements of parts which will be described in the specification and set forth in the appended claims.

Figure 5:
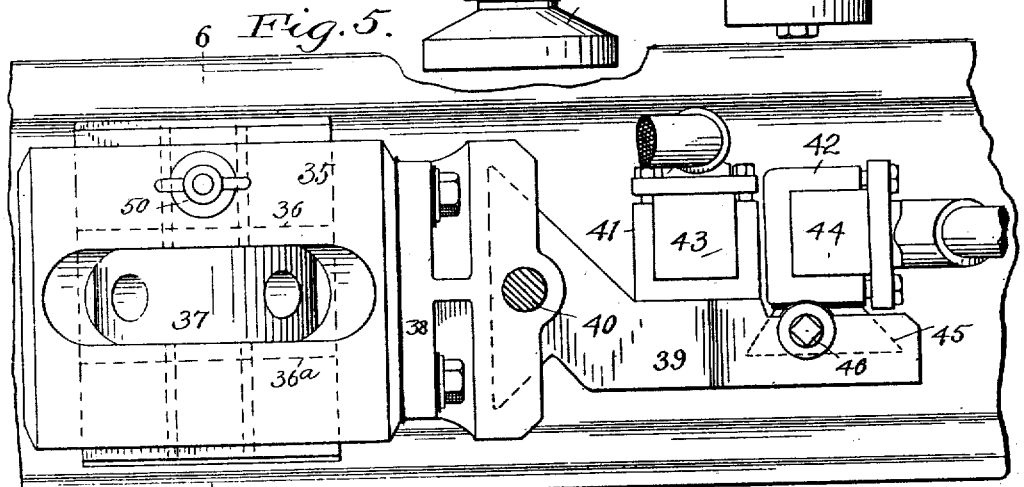
Figure 6:
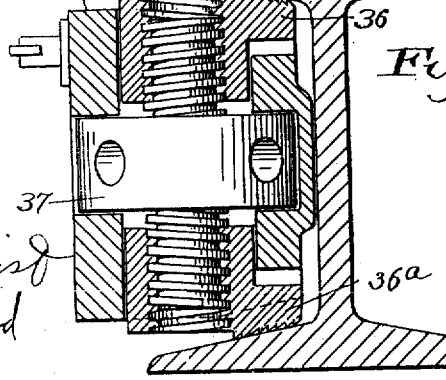
Figure 7:
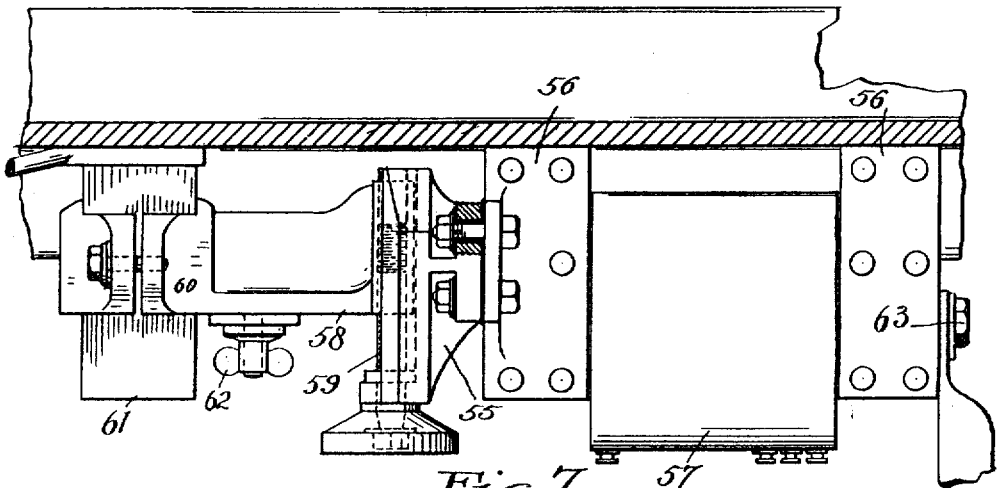
Figure 8:
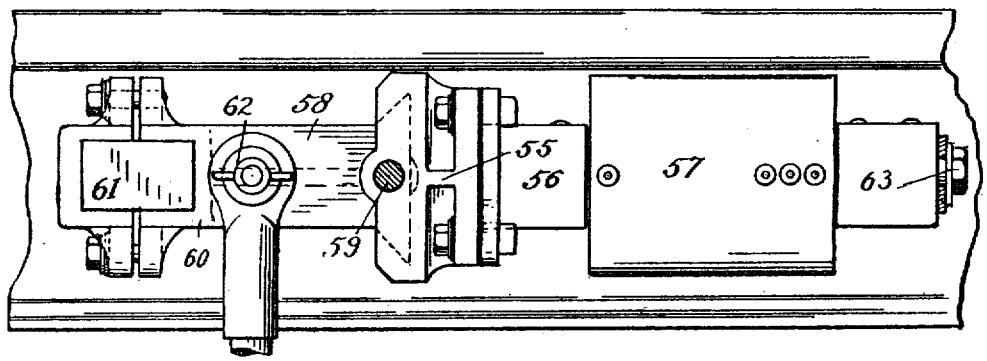

In the accompanying sheets of drawings, wherein we have shown several modifications of one of the important parts of our invention, Figure 1 is a side view showing the clamping and heating apparatus, the same being shown clamped to the rail to which the bond is adapted to be united; Fig. 2, is a top plan view of the same with the rail in horizontal section; Fig. 3, is an end view with parts in section; Fig. 4, is a top plan view of a modified form of the apparatus; Fig. 5 is a side view of the same; Fig. 6, is a sectional view substantially along the line 6—6 of Fig. 5; Fig. 7 is a top plan view showing a further modification; Fig. 8, is a side view of the same.

In accordance with our invention in its different modifications for use in bonding rails, the support or carrier for the clamping and heating parts of the apparatus is clamped or secured to the rail in such a manner as to leave the gage line entirely clear and unobstructed. In the construction shown in Figs. 1, 2 and 3, the parts are secured to the flange of the rail, in such a way that the electrode or electrodes are firmly positioned opposite the rail web.

This construction includes a support 10 provided along its innerside with a slot 10$^a$ adapted to receive a portion of the flange of the rail 11 to which the bond is adapted to be secured. The support 10 is adapted to be firmly clamped to the flange of the rail by a clamping member 12 provided with a slotted or hook like portion which engages the opposite part of the flange to that which engages the slot 10ª and provided also with a tongue 12ª which extends across beneath the flange and engages in a suitable slot in the lower portion of the support 10 located beneath the flange. The parts 11 and 12 can be firmly clamped to the rail or unclamped therefrom by means of a bolt 13 rotatably carried by the member 10 and having a threaded portion which engages in a suitable threaded opening in the inner end of the tongue 12ª. This bolt which is preferably provided with a head at its outer end can be adjusted by a suitable socket wrench 14 provided with a hand wheel 14ª, and which together with its hand wheel 14ª may, but need not have a permanent connection with the member 10. Preferably the wrench can be applied or removed from the head of the bolt at will.

The support 10 is provided above the adjusting bolt 13, and above the tongue 12ª with a slide or carriage 15 having a dove-tailed sliding connection with the upper part of the support 10 as shown particularly in Fig. 3. This slide member 15 may be adjusted in and out, or toward and away from the rail by means of an adjusting screw 16 having a suitable hand wheel or equivalent manual adjusting device 16ª. By the adjustment of the slide member 15 the pressure which is applied to the terminal of the bond can be varied. At the upper part of the slide member 15 are two separately adjustable slides 17 and 18, each being preferably provided with a dove-tailed sliding connection with the slide member 15, as shown in Fig. 3. These smaller slides 17 and 18 may be adjusted by screws 19 and 20 which are preferably rotatably supported in the slide member 15, and at their outer ends are provided with adjusting hand wheels. Secured to the slides 17 and 18 respectively are box like holders 21 and 22 which are insulated from their respective slides, and which are provided with separate high resistance electrodes 23 and 24—preferably carbon electrodes, the inner ends of which are adjacent each other as best shown in Fig. 2 and are adapted to bear against the head or terminal of the bond 25 which is to be welded to the web of the rail 11. The two electrode holders are provided with terminals and clamps 26 and 27 by which conductor terminals 28 and 29 are adapted to be electrically connected to the two holders.

In the use of this apparatus, by adjusting the screw 13, the support 10 is securely clamped to the flange of the rail. Then by adjusting the slides to which the two holders are secured, the inner ends of the high resistance electrodes 23 and 24 are brought against the face of the bond terminal 25, and then, by adjusting the slide 15 by means of the screw 16 and hand wheel 16ª the bond terminal can be clamped against the rail with the requisite amount of pressure. Then, if current is passed through the high resistance electrodes, the bond terminal is heated to a high degree by its contact with the electrodes. Heat will be transmitted by conduction to the contacting portion of the rail web, and by reason of the high degree of heat thus generated and the pressure with which the terminal and web are held together, an effective union is secured. Preferably the two electrodes 23 and 24 are in series relation,—the current passing from one electrode into the bond terminal and from the latter to the other electrode.

Although we prefer to use the electrodes simultaneously as above described, we may, if desired, use the electrodes separately and successively, or one at a time in which event the path of the current and consequently the connections will be somewhat different from that when the electrodes are in series relation. For this purpose the support 10 is also provided with a terminal and clamp 30 to which one terminal of the secondary may be connected. If the electrodes are used separately and successively, the terminals 28 and 29 connected to the electrodes will be connected in parallel to one end or terminal of the secondary of the transformer, and the other terminal of the secondary will be connected by the terminal and clamp 30 to the support 10. Thence by backing away one of the electrodes the other can be forced or clamped against one end of the bond head or terminal until that end is united to the rail, and thence the electrode previously used may be backed away and the other electrode in a similar manner can be brought up against the other part of the bond head, and such part will then be united to the rail.

The use of the two electrodes separately and successively, or the use of a single electrode adapted to be adjusted lengthwise of the rail has the advantage that only one-half the voltage is required as when the two electrodes are used in the series relation, and hence the capacity and size of the transformer may be reduced one-half over that required with the series relationship of electrodes, but the separate use of the electrodes has the disadvantage that to unite the bond terminal to the rail substantially twice the length of time is required as when the electrodes are employed simultaneously.

When the electrodes are used separately and successively, the current traverses from one terminal of the secondary of the transformer to the electrode which is in use, thence into the bond, thence into the rail, thence into the support 10, which is clamped against the rail and thence to the other terminal of the secondary.

In the modification shown in Figs. 4, 5 and 6 a supporting member 35 is adapted to be firmly clamped between the head and flange of the rail by a pair of clamping jaws 36 and 36ª, which are movable vertically in guides of the support toward and away from each other by means of a capstan screw 37 having screw threaded portions which engage suitable threaded portions of the two jaws 36 and 36ª respectively. Secured to the end of the support 35 by suitable bolts is a slide carrier 38 which is insulated from the support 35 by insulation shown in Fig. 4. This carrier 38 supports a slide in the form of a laterally projecting arm 39 which extends from the carrier 38 lengthwise of the rail and has a dove-tailed connection with the former so that the said arm can be adjusted toward or away from the rail web,—the adjustment being accomplished by a screw 40 rotatably supported in the carrier 38 and having a suitable threaded connection with the arm, the screw being provided at its outer end with an adjusting hand wheel 40ª. This arm 39 carries two relatively adjustable electrode holders 41 and 42, in which are rigidly secured high resistance electrodes 43 and 44. In this case, one of the holders 41 is secured in fixed position to the arm. The holder 42, is, however, carried by a slide 45 having a dove-tail connection with the arm and adjustable toward and away from the web of the rail by an adjusting screw 46. The electrode holder 42 is insulated from the arm, and both the holders are provided with terminals and clamps 46 and 47 by which the terminals of conductors may be electrically connected to the holders. Likewise the support 35 is provided with a terminal and clamp 50 by which a terminal may be electrically connected to said support.

This construction can be used in precisely the same manner as that first described. The inner ends of the two electrodes are adjacent each other and both can be brought simultaneously against the bond terminal and both can be forced against the same by adjusting the arm so that the bond and rail and electrodes are held together with the requisite pressure. The electrodes may be connected in series relationship if used simultaneously, or they may be employed separately, as before described, in which event, one terminal of the secondary will be connected by the clamp 50 to the support 35.

As far as certain features of our invention are concerned, it is not essential that the electrode holder be provided with two electrodes, for, if desired, a single electrode may be used. By way of illustration, in Figs. 7 and 8, we have shown a construction, which, while it embodies a further modification of the rail clamping feature of our invention, is provided with a single heating electrode. In this instance, the electrode holder or support 55 is adapted to be clamped against the web of the rail by a magnet having a core provided with two poles 56 adapted to engage the web of the rail between the head and flange, and a coil 57 through which current may pass to energize the magnet and to cause the same to be securely clamped magnetically against the rail. The member 55 is secured to one end of the magnet and is insulated therefrom as shown. This member 55 carries a laterally projecting arm 58 which has a sliding connection with the former in much the same manner as has the arm 39 with its support 38 in the construction shown in Figs. 4 to 6. The arm 58 which may be adjusted toward and away from the rail by an adjusting screw and hand wheel 59, has at its free end a box-like holder 60, in which is secured a single electrode 61. The arm has a terminal and clamp 62 to which one terminal of the secondary may be connected, and the core of the magnet has a terminal and clamp 63 to which the other terminal of the secondary may be connected. By adjusting the arm 58 toward the rail, the high resistance electrode 61 can be caused to bear with any desired degree of pressure against the bond, and thence current will be passed through the same. The bond and that portion of the rail in contact therewith is thus heated, the current passing from the secondary through the high resistance electrode, through the bond, through the rail, to the core of the magnet, and thence to the terminal leading to the other end of the secondary.

If desired, this electrode may be given the capacity of one of the electrodes of the two first described constructions, in which event, the electrode may be caused to unite one-half or part of the terminal to the rail, and may thence be moved lengthwise of the rail so as to engage and unite the other part of the terminal to the rail. In other words, the terminal can be united to the rail in substantially the same manner and with substantially the advantages as when it is united thereto by two electrodes applied separately and successively, as explained in connection with the two constructions first described. This could be accomplished with a single electrode by moving the entire apparatus lengthwise of the rail the required distance, or by a suitable adjustment in the electrode support which would enable the electrode to be adjusted lengthwise of the rail without moving the clamp, as is believed to be obvious. We prefer, however, to use two electrodes as the latter can be manipulated much more quickly and easily.

It will be understood, of course, that the electrode holder of the modification last described, may be provided with two heating electrodes, as in the first described constructions, one being shown in the last modification, not because it is preferable, but as illustrative of the statement that that part of the invention which concerns the manner of supporting and clamping the electrode holder to the rail does not require that two electrodes be employed.

Having thus described our invention, what we claim is:—

1. In a rail bonding apparatus, an electrode supporting member, means for supporting said member from a rail alongside the latter, comprising a rail clamping device connected to said member and having means for forming clamping engagement with the rail below the top line thereof so as to leave the gage line of the rail unobstructed, one or more electrodes carried by said member and means by which said electrode or electrodes may be caused to clamp a bond to the rail with sufficient pressure for bonding purposes.

2. In a rail bonding apparatus, an electrode supporting member, a support therefor including means by which the latter may be supported from and clamped to the rail alongside the latter said means adapted to engage the rail below the top thereof so as to leave the gage line unobstructed, an electrode carried by said electrode supporting member, and means whereby said member may be adjusted relative to said support to move the electrode toward or from the rail and to clamp the bond to the rail with sufficient pressure to cause the rail and bond to be united when heat is applied thereto.

3. In a rail bonding apparatus, an electrode holder, a support for said holder including means by which the latter may be supported from and clamped to the rail so that said holder is held along the rail and so as to leave the gage line unobstructed, an electrode carried by said holder, and means by which said electrode may be adjusted relative to the holder and rail whereby sufficient clamping pressure may be obtained between the rail and bond for bonding purposes.

4. In a rail bonding apparatus, an electrode holder, a support for said holder including means by which the latter may be supported from and clamped to the rail so that said holder is held along the rail and so as to leave the gage line unobstructed, an electrode carried by said holder, means by which said electrode may be adjusted relative to the holder, and means by which the holder may be adjusted relative to said support whereby sufficient clamping pressure between the rail and bond may be secured for bonding purposes.

5. In a rail bonding apparatus, an electrode holding member, a support therefor, a plurality of electrodes supported side by side on said holder and insulated from each other, and adjusting means connected with each electrode whereby each electrode may be adjusted toward and from the rail independently of the other.

6. In a rail bonding apparatus, an electrode holding member, a support therefor including means for securing said support in fixed position to the rail with said electrode holding member alongside and below the top of the rail, one or more electrodes carried by said holding member and means whereby said electrode or electrodes may be caused to clamp the bond and rail together with sufficient pressure for bonding purposes.

7. In a rail bonding apparatus, an electrode holding member, a support therefor including means for securing said support in fixed position to the rail with said electrode holding member alongside and below the top of the rail, a pair of relatively adjustable electrodes carried by said holder, said electrodes being insulated from each other, and means whereby said electrodes may be caused to clamp a bond to the rail with sufficient pressure for bonding purposes.

8. In a rail bonding apparatus, an electrode holding member, a support therefor including means for securing said support in fixed position to the rail with said electrode holding member alongside and below the top of the rail, one or more electrodes carried by said holding member, and means by which said member may be adjusted relative to the support toward or away from the rail whereby a bond and rail may be heated and sufficient clamping pressure obtained between the bond and rail to unite the bond to the rail.

9. In a rail bonding apparatus, an electrode holding member, a support therefor including means for securing said support to the rail with all parts located below and laterally of the top of the rail, whereby the gage line is unobstructed, one or more electrodes carried by said member and means whereby the electrode or electrodes may be moved from or forcibly against the rail or bond whereby the bond and rail may be heated and sufficient clamping pressure obtained between the bond and rail for bonding purposes.

10. In a rail bonding apparatus, an electrode holder, a support therefor, means for securing said support in fixed position to the rail with said electrode holding member alongside of and below the top of the rail so that the gage line is unobstructed, a pair of electrodes insulated from each other mounted upon said holder, and means for moving one of said electrodes with respect to the other toward and from the rail.

11. In a rail bonding apparatus, a support, an electrode holding member adjustably mounted upon said support, means for securing said support in fixed position with respect to the rail with said electrode holding member alongside of and below the top of the rail so that the gage line is unobstructed, an electrode mounted upon said holding member, means for moving said holding member toward and from the rail, and means for independently moving said electrode toward and from the rail.

12. In a rail bonding apparatus, a support, an electrode holding member carried upon said support, means for securing said support in fixed position with respect to the rail with said electrode member alongside of and below the top of the rail so that the gage line is unobstructed, a pair of electrodes insulated from each other and mounted upon the said holding member, means for moving said holding member toward and from the rail, and means for independently adjusting one or both of said electrodes with respect to the holding member toward and from the rail.

13. In a rail bonding apparatus, a support having means whereby it may be secured in fixed position with respect to the rail so that the gage line is clear and unobstructed, a box-like structure carried by the support at the side of the rail and adapted to receive an electrode, and means for moving said box-like structure toward and from the rail.

14. In a rail bonding apparatus, a support, an electrode holding member mounted upon said support, means for securing said support in fixed position with respect to the rail with said electrode holding member alongside of and below the top of the rail, a pair of box-like structures insulated from each other carried by said holding member, one or both of said box-like structures being adjustable toward and from the rail with respect to the holding member.

15. In a rail bonding apparatus, a support, having a portion adapted to fit on the lower flange of the rail, an arm carried by said support and adapted to engage the opposite lower flange of the rail, an electrode holding member carried by said support, the said support extending alongside of and below the top of the rail, and one or more electrodes carried by said support and adjustable toward and from the rail.

16. In a rail bonding apparatus, a support, said support being adapted to engage a lower flange of a rail, an extensible arm carried by the said support and adapted to extend beneath and engage the opposite lower flange of the rail, said support extending alongside of and below the top of the rail, one or more electrodes carried by said holding member, and means for adjusting said electrode holding member toward and from the rail.

17. In a rail bonding apparatus, a support for an electrode having means for gripping the rail so that the electrode may be supported by the rail without obstructing the gage line; an electrode carried by the support; and a screw adjusting device for moving the electrode in an endwise direction toward and from the rail, whereby a bond may be clamped to a rail by the electrode with sufficient pressure for bonding purposes.

18. In a rail bonding apparatus, a support having means for forming a clamping engagement with a rail, whereby electrodes carried by the support may be held at the side of the rail without obstructing the gage line; a pair of electrodes carried by the support; and screw adjusting devices operatively connected with the electrodes so that they may be independently adjusted in an endwise direction toward and from the rail, and whereby the bond may be clamped with sufficient pressure against the rail for rail bonding purposes.

19. In a rail bonding apparatus, a support, an electrode carried thereby, said support having means whereby it may be secured in fixed position with respect to a rail without obstructing the gage line and with the electrode at the side of the rail, and means whereby the electrode may be caused to press a bond to the rail with sufficient pressure for bonding purposes.

20. In a rail bonding apparatus, a support, and means carried by said support for heating and for causing the bond to be pressed against the rail with sufficient pressure for bonding purposes, said support having means whereby it may be secured to the rail with the gage line clear and unobstructed.

In testimony whereof, we hereunto affix our signatures in the presence of two witnesses.

LAWRENCE P. CRECELIUS.
PAUL H. EBERLEIN.

Witnesses:
A. F. KWIS,
A. J. HUDSON.